Patented Feb. 6, 1951

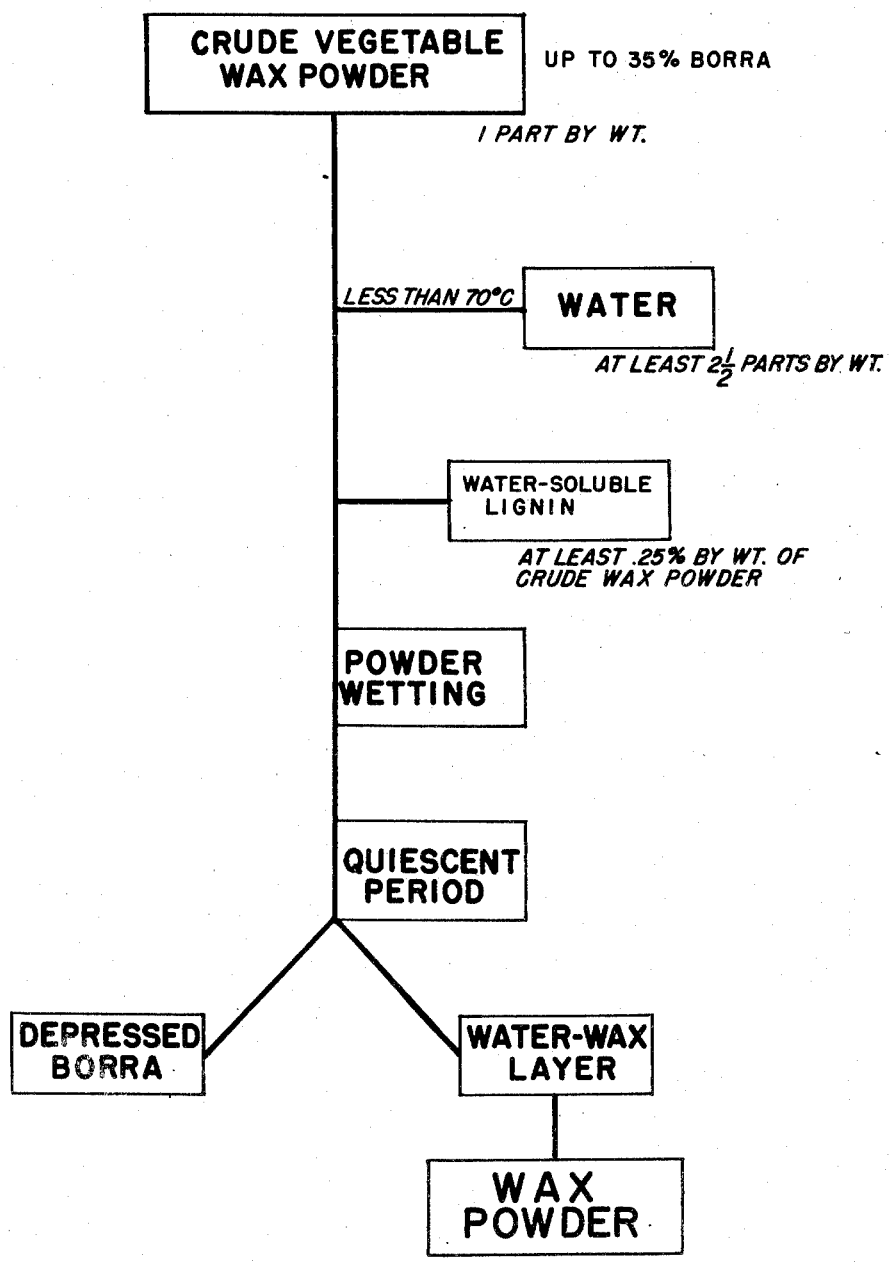

2,540,978

UNITED STATES PATENT OFFICE 2,540,978

REFINING OF VEGETABLE WAX POWDER

Alfred F. Buckman, Jr., Racine, Wis., assignor to S. C. Johnson & Son, Inc., Racine, Wis.

Application May 15, 1948, Serial No. 27,359

10 Claims. (Cl. 209—173)

This invention relates to the manufacture of raw material wax. More specifically, it relates to an improved process for removing known waxy matter from crude vegetable wax powder.

Many vegetable waxes such as esparto grass wax, carnauba wax and ouricury wax are removed from the plants by mechanical means and are, therefore, in the form of crude wax powder containing small particles of crude wax together with particles of vegetable matter. In the case of carnauba wax, the leaves are cut from the carnauba palm and allowed to dry. The wax largely remains inclosed in the crevices of the dry and shrunken leaves. When the wax powder is removed from the leaves, a large amount of leafy matter becomes mingled with the wax particles. This leafy matter is also in powdered form of a particle size, shape and mass comparable to that of the wax powder from which it can scarcely be distinguished.

Various methods have been proposed for the removal of this leafy matter or borra as it is known in Brazil. One of the most successful of these methods, which is now in commercial use, is that described in U. S. patent to Johnson, Steinle and Gardiner No. 2,275,630. By this method the crude vegetable wax powder is screened through one or more screens of about 40 to 60 mesh, and the fines of the screening operation, which contain the wax, are subjected to a further treatment in a centrifugal air flotation separator whereby additional leafy matter or borra may be reduced from its original content of 20-35% down to a minimum of 12%.

Although the above process has contributed considerably to the production of light-colored wax, nevertheless, the amount of leafy matter or borra which remains tends to darken the wax upon subsequent melting.

Now in accordance with my invention, I have developed an improved process for removing leafy matter or borra from crude vegetable wax powder. This process, which is limited to the treatment of crude vegetable wax powder which has not been melted in the production thereof, comprises contacting crude vegetable wax powder with water and a water-soluble lignin, agitating the mixture sufficiently to wet said wax, allowing said mixture to remain quiescent until a wax layer is formed on the surface of said water, and recovering powdered wax from said wax layer.

The drawing shows a flow sheet covering the essential steps of my process.

Now, having indicated in a general way the nature and purpose of this invention, the following examples will illustrate the invention. It is to be understood, however, that such examples are presented merely as illustrations of the invention and are not to be construed as limiting the same.

In the examples the ingredients are given in parts by weight unless otherwise indicated.

Example 1

Two hundred parts of crude carnauba wax powder, prepared by the method described in U. S. Patent No. 2,275,630 and containing about 15-18% of leafy matter, was charged into an open vessel. With the aid of mechanical agitation, the wax powder was thoroughly wet with a solution of 520 parts water and 2.5 parts of sodium lignin sulfonate. After the wax had been thoroughly wet, a liquid slurry was formed by adding 1,560 parts of water. This slurry was allowed to remain quiescent the vessel for 1.5 hours. A thick wax layer was formed on the surface of the liquid and the borra separated and settled to the bottom of the vessel. The wax layer was removed and placed in a permeable basket centrifuge or filter press. This wax layer contained about 30% wax and 70% water. The centrifuge was operated for approximately 30 minutes. This wax cake, after centrifuging, had a moisture content of about 40%. The wax was then removed from the centrifuge, broken up into small lumps and air-dried in open trays. The borra content of the resulting dried wax powder was reduced to about 3%.

Example 2

Two hundred parts of crude carnauba wax powder, prepared by the method described in U. S. Patent No. 2,275,630 and containing about 15-18% of leafy matter, was charged into an open vessel and was wet with 520 parts of water with the aid of mechanical agitation. After the wax had been thoroughly wet, a liquid slurry was formed by adding a solution of 1560 parts of water containing 2.5 parts of sodium lignin sulfonate. This slurry was allowed to remain quiescent in the vessel for about 1.5 hours. A wax layer formed on the surface of the liquid and the borra separated and settled to the bottom of the vessel. The wax layer was removed and treated as in Example 1. The borra content of the resulting dry wax powder was reduced to about 3%.

Example 3

Two thousand eighty parts of water containing 2.5 parts of sodium lignin sulfonate, were charged into an open vessel provided with mechanical agitation. The agitation was commenced and 200 parts of dry crude carnauba wax powder were added while the agitation was continued at a rate sufficiently slow so that the wax introduced into the vessel was thoroughly wet before additional wax was added. After the wax had been all thoroughly wet, agitation was stopped and mixture allowed to remain quiescent in the vessel for 1.5 hours. A wax layer was formed on the surface of the liquid and the borra separated and settled to the bottom of the vessel. The wax layer was removed and treated in accordance with the procedure of Example 1. The borra content of the resulting dried wax powder was reduced to 3%.

*Example 4*

Example 1 was repeated except that soluble sodium lignin was substituted for the soluble sodium lignin sulfonate. The results obtained were substantially the same as in Example 1.

*Example 5*

Example 3 was repeated except that soluble sodium lignin was substituted for the soluble sodium lignin sulfonate. The results obtained were substantially the same as in Example 1.

*Example 6*

Example 1 was repeated using amounts of soluble sodium lignin or soluble sodium lignin sulfonate varying from .5 to 5 parts. The results attained were substantially the same as in Example 1.

In the above examples there has been thus illustrated my improved process for removing leafy matter or borra from crude vegetable wax powder. The examples illustrate the treatment of dry crude vegetable wax powder having a borra content of 15-18% which upon treatment was reduced to approximately 3%. It will be noted that this result was achieved in 1.5 hours.

As shown in the examples the dry crude vegetable wax powder may be premixed with approximately 2½ times its weight of water-lignin solution or the wax powder may be premixed with approximately 2½ times its weight of water alone. As in Example 2 when not employed in the premix, the lignin is subsequently put in solution with additional water which forms a slurry with the premix after the wax powder is thoroughly wet. If wax is placed in the vessel without becoming thoroughly wet, it will ride upon the surface of the liquid and efficient separation of borra from this portion will not be achieved.

Ordinarily in carrying out this process, cold water or water of around 20-25° C. may be used. The use of hot water or water of more than 70° C. sometimes results in emulsification of the wax in the water and interferes with an efficient separation of the borra from the wax. Therefore, the use of water of a temperature of not more than 70° C. is recommended.

While in the examples the total volume of water to wax is about 10:1 by weight, it should be realized that this ratio may be varied. While it is recommended approximately 10 parts of water to 1 part of wax by weight be used, the ratio of water to wax may be increased over that amount, but the addition of excessive amounts of water provides additional recovery problems.

It has been found that a ratio of about 2½ parts of water per part of wax provides adequate water for wetting. Less than this amount will result in incomplete wetting and thus reduces the efficiency of separation of borra.

While in the examples soluble sodium lignin and sodium lignin sulfonate were used, it is to be understood that the invention is not so limited. Any lignin material extracted from wood, bagasse or similar materials may be used providing it is water-soluble. Ordinarily these lignins are known as alkali lignin and are desirably extracted by a soda or sulfate process.

In the examples amounts of water soluble lignin varying from .25 to 2.5% by weight of the wax charge have been used. This range is preferred, although a larger percentage of water-soluble lignin may be used but no appreciable improvement in the separation, or reduction in the time allowed therefore, is achieved. However, care should be exercised that amounts of at least .25% be used since less lignin content in the aqueous medium shows no increased efficiency over water alone.

In the examples the time that the mixture was allowed to remain quiescent to allow the wax particles to form a wax layer on the surface of the water and the borra to settle has been shown as about 1.5 hours. It will be understood that this time can be varied within a wide range, although the efficiency of the process is somewhat affected by the failure to allow the mixture to stand quiescent the length of time as prescribed in the examples. It is recommended that a quiescent period of at least 1.5 hours be used although the wax layer may be removed as formed, if desired.

It should be realized that a continuous operation can be accomplished by a gradual introduction of the wax-water mixture to additional water and a gradual withdrawal of the borra and wax layer.

While the examples have illustrated the separation of leafy matter or borra from crude carnauba wax powder, it will be understood that this process is equally applicable to other vegetable wax powders such as esparto grass wax and ouricury wax which are obtained from plant fibers in the form of a powder.

In Example 1 the moisture content of the wax layer was shown as about 70%. This will vary over a considerable range from a quite firm thick wax to a creamy fluid. The reduction in moisture content from 70% to 40%, as shown in Example 1, was sufficient to open the capillaries of the wax powder so that rapid air drying could be achieved.

By the practising of my invention, a light-colored wax is obtained which greatly increases the commercial uses of the vegetable wax. It is anticipated that the dry vegetable wax powder will be treaed with adsorbents and melted, thus obtaining a wax of sufficient lightness to eliminate the necessity of bleaching with chemicals which are well known in the art. While chemical bleaching agents often provide a lightness of color, the resulting alteration of the structural and chemical nature of the original wax is detrimental where the particular characteristics of the original wax are desired.

I claim:

1. A process for purifying crude vegetable wax powder which has not been melted in the production thereof, comprising contacting crude vegetable wax powder with water and at least .25% by weight of the wax charge of a water-soluble lignin, said water having a temperature of not more than 70° C. and being present in an amount of at least 2½ parts of water per part of wax, agitating the mixture sufficiently to wet said wax, allowing said mixture to remain quiescent for a period of at least an hour and a half until a wax layer is formed on the surface of said water, and recovering powdered wax from said wax layer.

2. A process for purifying crude carnauba wax powder, which has not been melted in the production thereof, comprising contacting crude carnauba wax powder with water and at least .25% by weight of the wax charge of a water-soluble lignin, said water having a temperature of not more than 70° C. and being present in an amount of at least 2½ parts of water per part of wax, agitating the mixture sufficiently to wet said wax, allowing said mixture to remain quiescent for a period of at least an hour and a half until a wax layer is formed on the surface of said water, and recovering powdered wax from said wax layer.

3. A process for purifying crude vegetable wax powder, which has not been melted in the production thereof, comprising contacting crude vegetable wax powder with water and at least .25% by weight of the wax charge of soluble sodium lignin, said water having a temperature of not more than 70° C. and being present in an amount of at least 2½ parts of water per part of wax, agitating the mixture sufficiently to wet said wax, allowing said mixture to remain quiescent for a period of at least an hour and a half until a wax layer is formed on the surface of said water, and recovering powdered wax from said wax layer.

4. A process for purifying crude vegetable wax powder, which has not been melted in the production thereof, comprising contacting crude vegetable wax powder with water and at least .25% by weight of the wax charge of soluble lignin sulphonate, said water having a temperature of not more than 70° C. and being present in an amount of at least 2½ parts of water per part of wax, agitating the mixture sufficiently to wet said wax, allowing said mixture to remain quiescent for a period of at least an hour and a half until a wax layer is formed on the surface of said water, and recovering powdered wax from said wax layer.

5. A process for purifying crude carnauba wax powder, which has not been melted in the production thereof, comprising contacting crude carnauba wax powder with water and at least .25% by weight of the wax charge of soluble sodium lignin, said water having a temperature of not more than 70° C. and being present in an amount of at least 2½ parts of water per part of wax, agitating the mixture sufficiently to wet said wax, allowing said mixture to remain quiescent for a period of at least an hour and a half until a wax layer is formed on the surface of said water, and recovering powdered wax from said wax layer.

6. A process for purifying crude carnauba wax powder, which has not been melted in the production thereof, comprising contacting crude carnauba wax powder with water and at least .25% by weight of the wax charge of soluble lignin sulphonate, said water having a temperature of not more than 70° C. and being present in an amount of at least 2½ parts of water per part of wax, agitating the mixture sufficiently to wet said wax, allowing said mixture to remain quiescent for a period of at least an hour and a half until a wax layer is formed on the surface of said water, and recovering powdered wax from said wax layer.

7. A process for purifying crude vegetable wax powder, which has not been melted in the production thereof, comprising contacting crude vegetable wax powder with water and at least .25% by weight of the wax charge of a water-soluble lignin, said water having a temperature of not more than 70° C. and being present in an amount of at least 2½ parts of water per part of wax, agitating the mixture sufficiently to wet said wax, increasing the amount of water until a liquid slurry is formed, allowing said liquid slurry to remain quiescent for a period of at least an hour and a half until a wax layer is formed on the surface of said liquid, and recovering powdered wax from said wax layer.

8. A process for purifying crude vegetable wax powder, which has not been melted in the production thereof, comprising contacting crude vegetable wax powder with water, said water having a temperature of not more than 70° C. and being present in an amount of at least 2½ parts of water per part of wax, agitating said wax-water mixture sufficiently to wet said wax, contacting said mixture with a solution of water and at least .25% by weight of the wax charge of a water-soluble lignin until a liquid slurry is formed, allowing said liquid slurry to remain quiescent for a period of at least an hour and a half until the wax layer is formed on the surface of said liquid, and recovering powdered wax from said wax layer.

9. A process for purifying crude vegetable wax powder, which has not been melted in the production thereof, comprising contacting crude vegetable wax powder with water, said water having a temperature of not more than 70° C. and being present in an amount of at least 2½ parts of water per part of wax, agitating the wax-water mixture sufficiently to wet said wax, adding at least .25% by weight of the wax charge of a water-soluble lignin to water to form a water-lignin solution, adding said water-lignin solution to said water-wax mixture sufficient to form a liquid slurry, allowing said liquid slurry to remain quiescent for a period of at least an hour and a half until a wax layer is formed on the surface of said liquid, and recovering powdered wax from said wax layer.

10. A process for purifying crude vegetable wax powder, which has not been melted in the production thereof, comprising adding dry crude vegetable wax powder to a water-lignin solution, having lignin in amount of at least .25% by weight of the charge, at a rate at which said wax is substantially thoroughly wet while said solution is being agitated, said solution having a temperature of not more than 70° C. and the ratio between said wax and solution being at least 2½ parts of solution per part of wax allowing said mixture to remain quiescent for a period of at least an hour and a half until the wax layer is formed on the surface of said solution, and recovering powdered wax from said wax layer.

ALFRED F. BUCKMAN, Jr.

REFERENCES CITED

The following references are of record in the file of this patent:

UNITED STATES PATENTS

| Number | Name | Date |
|---|---|---|
| 1,842,002 | Zschoch et al. | Jan. 19, 1932 |
| 2,310,492 | Nagelvoort | Feb. 9, 1943 |

OTHER REFERENCES

Bennett, Commercial Waxes (1944), Chem. Publishing Co., pages 74 to 76. (Copy in Division 33).